(12) United States Patent
Khani et al.

(10) Patent No.: US 11,046,849 B2
(45) Date of Patent: Jun. 29, 2021

(54) THIN FILM ALIPHATIC POLYUREA AND SYSTEM

(71) Applicant: Line-X LLC, Huntsville, AL (US)

(72) Inventors: Elaheh Khani, Huntsville, AL (US); Terry Pe, Huntsville, AL (US)

(73) Assignee: LINE-X LLC, Huntsville, AL (US)

( * ) Notice: Subject to any disclaimer, the term of this patent is extended or adjusted under 35 U.S.C. 154(b) by 177 days.

(21) Appl. No.: 16/176,527

(22) Filed: Oct. 31, 2018

(65) Prior Publication Data

US 2019/0136051 A1  May 9, 2019

Related U.S. Application Data (60) Provisional application No. 62/579,627, filed on Oct. 31, 2017.

(51) Int. Cl.

| | |
|---|---|
| *C08L 75/02* | (2006.01) |
| *C08G 18/32* | (2006.01) |
| *C08G 18/34* | (2006.01) |
| *C08G 18/73* | (2006.01) |
| *C08G 18/79* | (2006.01) |
| *C08G 18/38* | (2006.01) |
| *C08L 67/04* | (2006.01) |
| *B05B 7/16* | (2006.01) |
| *B05B 7/04* | (2006.01) |
| *C08L 33/08* | (2006.01) |
| *C09D 175/02* | (2006.01) |

(52) U.S. Cl.
CPC .............. *C08L 75/02* (2013.01); *B05B 7/04* (2013.01); *B05B 7/1613* (2013.01); *C08G 18/3821* (2013.01); *C08G 18/73* (2013.01); *C08G 18/79* (2013.01); *C08G 18/792* (2013.01); *C08L 33/08* (2013.01); *C08L 67/04* (2013.01); *C09D 175/02* (2013.01); *C08G 2150/50* (2013.01); *C08L 2203/16* (2013.01)

(58) Field of Classification Search
None
See application file for complete search history.

(56) References Cited

U.S. PATENT DOCUMENTS

| | | |
|---|---|---|
| 7,928,160 B2 | 4/2011 | Senkfor et al. |
| 2002/0123593 A1 | 9/2002 | Milhem |
| 2003/0036585 A1* | 2/2003 | Purgett ............... C08K 7/18 523/172 |
| 2003/0105220 A1* | 6/2003 | Gupta ............ C08G 18/3234 524/589 |
| 2006/0046068 A1 | 3/2006 | Barancyk et al. |
| 2007/0078255 A1 | 4/2007 | Mager et al. |

FOREIGN PATENT DOCUMENTS

WO  2013009999 A2  1/2013

OTHER PUBLICATIONS

Dormish, Jeffrey F.: "Polyaspartic Coatings" Q&A About Polyurethanes; Adhesives & Sealants Industry (Year: 2016).*
International Search Report and Written Opinion issued in PCT application PCT/US2018/058401, dated Feb. 25, 2019.

* cited by examiner

Primary Examiner — Michael J Feely
(74) Attorney, Agent, or Firm — Benesch, Friedlander, Coplan & Aronoff LLP (57) ABSTRACT

A thin film that is a result of polyaspartic secondary aliphatic diamines reacted with a low viscosity aliphatic polyisocyanate is provided. A unique feature of the films is the ability to tailor the dry time of this coating. Methods for making the film use a plural component spray machine that has an atomizer and a fluid housing connected to two pressurized and heated component tanks. A polyaspartic ester containing resin and aliphatic polyisocyanate mix through high pressure impingement within the spray machine. A reactant mixture exits the spray machine via the atomizer and forms a film on a surface that is tack free in about 5 minutes.

17 Claims, 6 Drawing Sheets

| Formula | Structure "R" | Reactivity to Aliphatic Polyisocyanates |
|---|---|---|
| I | ![structure I] | Very Slow |
| II | ![structure II] | Medium Fast |
| III | ![structure III] | Fast |

THIN FILM ALIPHATIC POLYUREA AND SYSTEM

PRIORITY

This application claims priority to U.S. Provisional Pat. App. No. 62/579,627, filed on Oct. 31, 2017, which is incorporated by reference herein in its entirety.

BACKGROUND

Polyureas are a type of elastomer with wide applicability due to versatility in selection of material available for use. They are more durable than paint or rubber. They may form a coating that is waterproof and resistant to corrosion. However useful the polyurea based coatings have proven, the difficulty has been in the application. Specialized equipment, extensive time for curing, and necessary curing at high temperatures are exemplary drawbacks to more widespread availability of polyurea based coatings.

SUMMARY

In one embodiment, a thin polyurea film coating resulting from the reaction of a polyaspartic ester resin with a low viscosity aliphatic polyisocyanate is provided. In one embodiment, the aliphatic polyisocyantate may be hexamethylene diisocyanate trimer and the ester resin may include a hydroxyl functional polyester, a polyacrylate, an additive or a combination thereof. Importantly, the two reactants components may be in a volumetric ratio of 1:1. The film may contain from about 70-100% solids. The film may be UV resistant or have an impact resistance of at least about 320 inch pounds. The resin may have additives that result in a finished film with smooth, powder coat, gloss or semi-gloss finish. It has been found that by using a polyaspartic ester, one may tailor the dry time of the film coating.

A method for making the polyurea films is also provided. The method includes the use of a plural component spray machine that includes an atomizer and a fluid housing connected to two pressurized and heated component tanks, one that is a source of polyaspartic ester resin and the other a source of the aliphatic polyisocyantate. In use, the spray machine applies a mixture of the ester resin and aliphatic polyisocyanate to a surface. The resin and polyisocyanate mix through high pressure impingement within the fluid housing of the spray machine and exit the spray machine via the atomizer. The spray machine produces a film on a surface that is tack free in about 5 minutes after application to the surface.

The spray machine may be used in such a manner that varying the temperature and pressure conditions and the atomizer tips obtains a mixture that has a gel time of about 45 seconds and the film is dry to the touch in about 3 minutes after application to a surface. The method can be used with additives in the resin component result in a film with smooth, powder coat, gloss or semi-gloss finish.

BRIEF DESCRIPTION OF THE DRAWINGS

In the accompanying figures, chemical formulas, chemical structures, and experimental data are given that, together with the detailed description provided below, describe example embodiments of the claimed invention.

DETAILED DESCRIPTION

Certain embodiments are described below. While the embodiments are described in considerable detail, it is not the intention to restrict or in any way limit the scope of the appended claims to such detail, or to any particular embodiment.

In one embodiment, a UV-stable coating system that can meet the standard properties of the paint and powder coat market is disclosed and includes a 100% solid aliphatic polyurea film system. The polyurea film has exceptional physical properties while enabling the user to control the cost of the product. The polyurea film offers weather stability, toughness, flexibility, along with an alluring gloss or semi-gloss look in both texture and smooth finish.

In one embodiment, a thin polyurea film coating resulting from the reaction of a polyaspartic ester resin with a low viscosity aliphatic polyisocyanate is provided. In one embodiment, the aliphatic polyisocyanate may be hexamethylene diisocyanate trimer and the ester resin may include a hydroxyl functional polyester, a polyacrylate, an additive or a combination thereof.

It has been found that polyaspartic esters are excellent reactive diluents for high solids polyurethane coatings. They can be blended with hydroxyl functional polyester and polyacrylate co-reactants thus allowing for reduction of VOC in relatively high solvent containing coatings systems. Because of the moderately fast curing feature of those esters with aliphatic polyisocyanates, these coatings can provide money saving productivity improvements, along with high film build, low temperature curing, and abrasion and corrosion resistance.

Moreover, polyaspartic technology allows for the formulation of coatings which exhibit fast cure/high productivity, high film build (about 0.15 mils), bubble free film surface, formulation flexibility, controlled cure, non-yellowing, high gloss retention, less waste and high solids from 70% to 100%. The thin film aliphatic polyurea is fully described including different chemistries and process parameters. The thin film is result of polyaspartic esters blended with a hexamethylene diisocyanate trimer utilized as a hardener.

The exotherm reaction achieves a 45 second gel time along with a tack free time of less than 3 minute at room temperature with 50% Relative Humidity (RH), yielding an appealing smooth or textured semi-gloss application.

Polyaspartic esters have a unique reactivity with aliphatic polyisocyanates because of their chemical structure. In one embodiment, secondary aliphatic diamines may serve as the source of the polyaspartic esters. These secondary aliphatic diamines can be prepared from a variety of different primary amines and dialkyl maleates via a Michael Addition Reaction. Thus, it is possible to create an entire family of aspartates with structural variations which result in varying degrees of reactivity and film properties when reacted with polyisocyanates.

Figure 1:
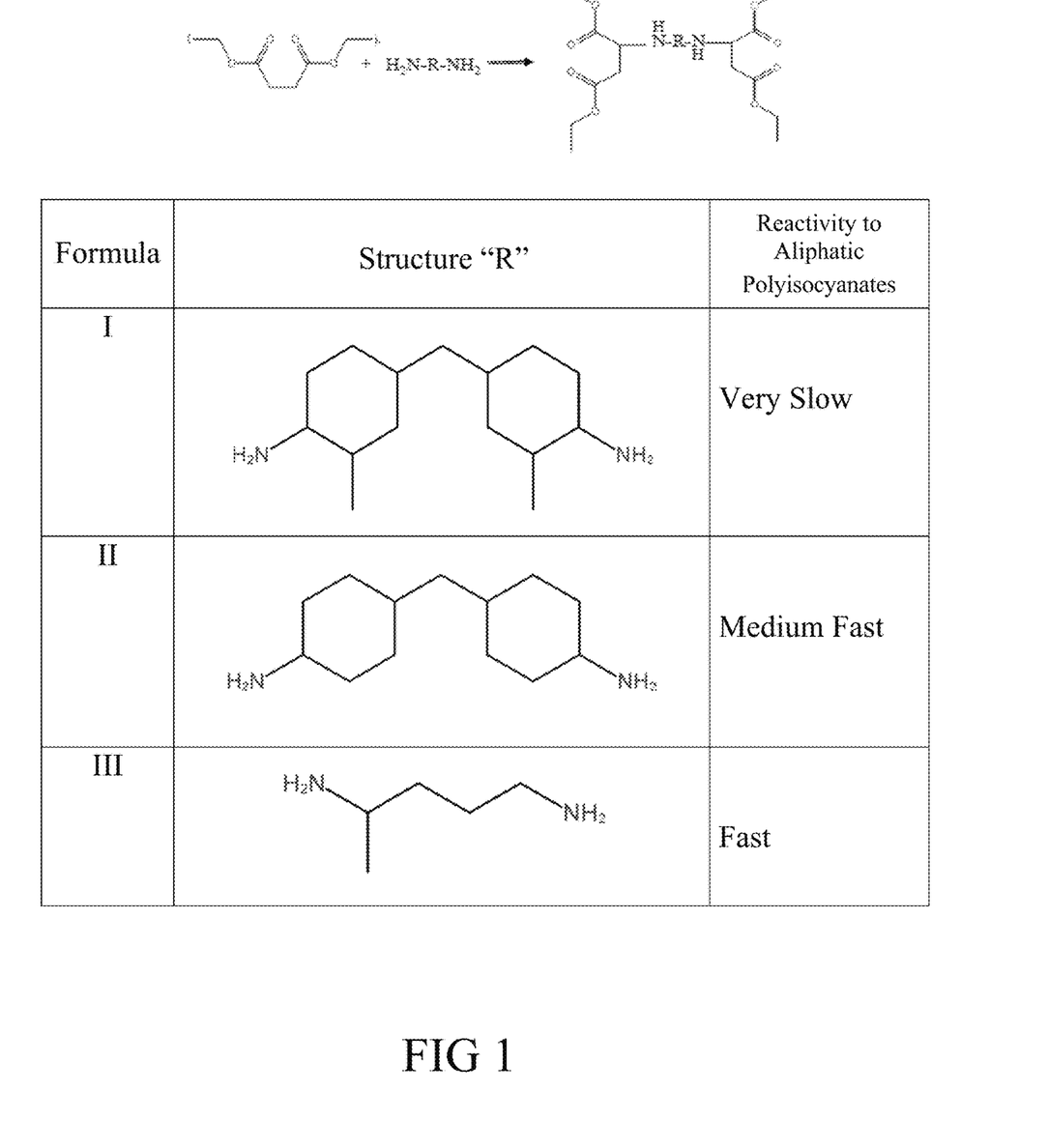
FIG. 1 is a chemical synthetic process for forming a polyurea film.

As shown in FIG. 1, polyaspartic esters are reacted with iminooxadiazine dione to evaluate and compare the speed of reactions and tack free time. Common diamines are all aliphatic with cyclic or linear characteristics.

Exemplary polyaspartic esters are represented by the following formula:

where R is derived from

Formula I

Formula II or

Formula III

In one embodiment, the films have 70 to 100% by weight solids, even more preferably 100% by weight solids. Moreover, it should be understood that any polyaspartic ester, or combinations thereof, may be used to make the films, and the ester resin component of the film may comprise between about 90 and 100% by weight of polyaspartic ester. Additives may be added to the resin. The additives may include UV absorbers, light stabilizers and anti-oxidation additives. The additives may be present in an amount between about 1% and about 10% by weight. The polyisocyanate generally has a viscosity of less than 600 cP at room temperature.

The unique structural feature of a suitable polyaspartic ester is a sterically crowded environment around the nitrogen. Additionally, the ester portion of the structure provides inductive effects. These features both act to slow down the reaction of the amino group of the polyaspartic ester compound and the isocyanate group of the polyisocyanate. Practically speaking, it has been found that a slower reaction speed between the isocyanate and an aliphatic diamine results in longer gel times and thus, a longer application window. The ability to change the amount of crowding around the nitrogen allows the reactivity to be tailored to suit the needs of the applicator.

Figure 2:
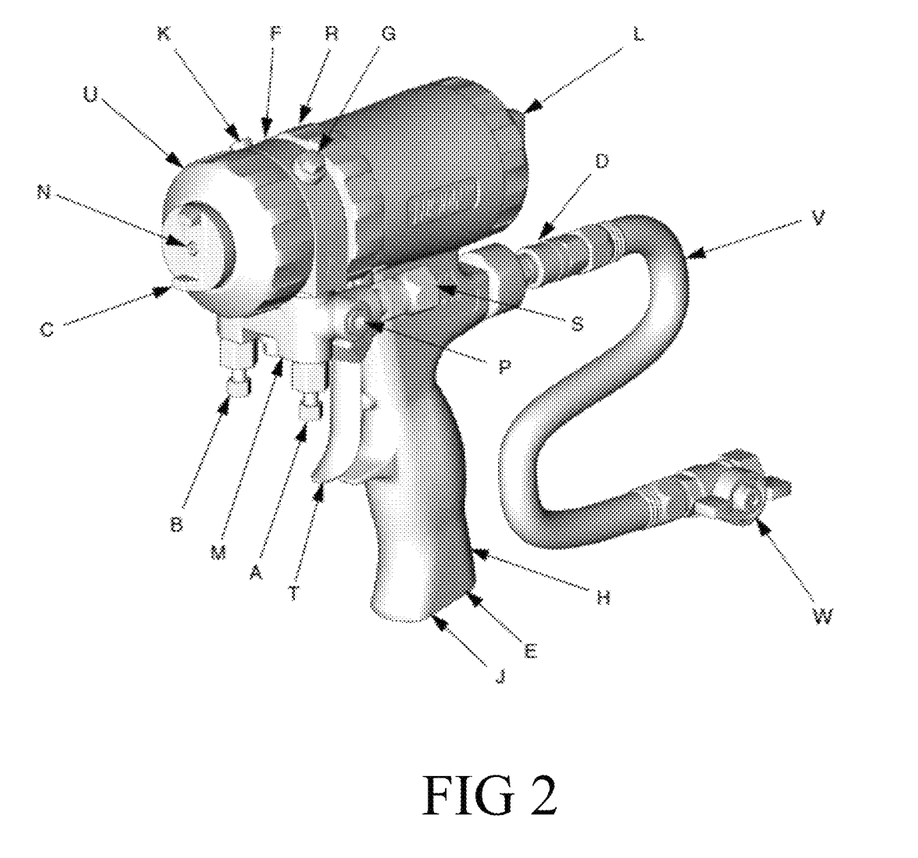
FIG. 2 is a perspective view of a spray machine used to apply the polyurea film of the present invention.

In another embodiment, it has been found that the use of high-pressure impingement mixing is particularly useful in preparing coatings and elastomers using polymeric systems that have very fast reaction kinetics. FIG. 2 is a perspective view of an exemplary high-pressure plural component spray mixing machine used to mix the ester resin and polyisocianate mixture. The elements of the spray machine will now be described: A—side fluid valve for connection to a pressurized tank of aliphatic polyisocyanate; B—side fluid valve for connection to a pressurized tank of resin; C—an air cap; D—an air line quick coupler; E—a muffler; F—a fluid housing; G—a grease fitting (under cap); H—handle; J—optional air inlet; K—cleanoff air valve; L—piston safety lock; M—gun fluid manifold; N—mix chamber nozzle; P—Optional fluid inlets (A side shown); R—lock ring; S—fluid inlet swivels (A side shown); T—trigger; U—front retaining ring; V—gun air whip hose; W—air valve.

The plural component spray machine includes an atomizer that has a mix chamber nozzle and an air cap operably connected to fluid housing via a front retaining ring; a front retaining ring operably connected to a fluid housing; the fluid housing having a lock ring, a grease fitting and operably fitting into a gun fluid manifold; the gun fluid manifold communicating with two side fluid valves and optionally communicating with at least one additional fluid inlet and fluid inlet swivel; the gun fluid manifold also in direct contact with a muffler that may also serve as a handle, a trigger and an air line quick coupler, and the fluid housing additionally optionally comprising a piston safety lock. Different combinations of pressure, temperature, mixing chambers and atomizing tips are available.

The films, methods and apparatus herein described provide the advantage of fast curing films. The films are described as providing a film that is dry to the touch in under 10 minutes, and preferably about 5 minutes, and even more preferably about 3 minutes. The term dry to the touch is the same as tack free. While this term does not indicate the film is cured, the object to which the film has been applied may be moved or otherwise manipulated.

In one embodiment, an air purge spray gun is used to mix the polyisocyanate and ester resin and then apply the mixture to a surface to form a film on the surface.

The coating characteristics and test results of the thin film are now described. The details of the testing such as UV Stability (ASTM G154), Taber Abrasion (ASTM D4060), Hardness (ASTM D2240), Impact Resistance (ASTM D2794), Pull-Off Adhesion (ASTM C297) and Chip Resistance (ASTM D3170) provide ample evidence of the uniqueness of this chemistry. The thin film is shown in comparison to prior art coatings such as powder coat and paint.

In Table 1, the change in drying characteristics of aspartate coatings, including the polyurea film disclosed, is illustrated. The nine different resin blends have been evaluated for dry time in reacting with low viscosity aliphatic isocyanates. Those resins have different ratios of blending polyaspartic esters and additives. All formulations are at 100% solids.

TABLE 1

| Resin blend | 1 | 2 | 3 | 4 | 5 | 6 | 7 | 8 | 9 |
|---|---|---|---|---|---|---|---|---|---|
| Surface Dry | 5 h | 2.5 h | 30 min | 9 min | 7 min | 1 min | | | |
| Hard Dry | 11 h | 7 h | 1.5 h | 21 min | 18 min | 13 min | 9 min | 6 min | 3 min |

The polyurea film was unique in reacting with low viscosity polyisocyanate and had a 45 second gel time and was dry to the touch in 3 minutes. The film had a smooth semi-gloss look. This chemistry builds up 15-20 mils film which can have smooth or fine texture look.

The results of tensile strength (ASTM D412) and Elongation (ASTM D412) on films formed on a surface by different application conditions are shown in Table 2.

TABLE 2

Comparison of three different film application methods using tests tensile strength (ASTM D412) and Elongation (ASTM D412) at room temperature and 50% relative humidity

| Machine set up | ASTM D412 tensile | Tensile STD | ASTM D412 elongation | Elongation STD |
|---|---|---|---|---|
| I | 1438 psi | 89 | 132% | 3 |
| II | 1387 psi | 60 | 116% | 3 |
| III | 2385 | 150 | 99% | 7 |

As shown in Table 2, for the machine set up (I) the static pressure for isocyanate and ester resin tanks are between 1800 to 2000 psi and for both resin and isocyanate tanks the temperature is 100° F. Also, the gun mixing chamber was AF2020. The coating was sprayed at 0.019 inches. For the machine set up (II) the static pressure for isocyanate and resin tanks are between 1700 to 1750 psi and for both resin and isocyanate tanks the temperature is 120° F. Also the gun mixing chamber was AF2929. The coating was sprayed at 0.018 inches. For the machine set up (III) the static pressure for isocyanate and resin tanks are between 2000 to 2050 psi and for both resin and isocyanate tanks the temperature is 160° F. Also gun mixing chamber was AF2929. The coating was sprayed at 0.017 inches.

To find the minimum thickness with the fastest cure and best physical properties, different thicknesses of coating have been sprayed. Also the effects of different weathering conditions on the curing process were evaluated through running tests according to ASTM D412. The results of those tests are reported in Tables 3, 4 and 5, below.

TABLE 3

Tensile Strength was measured by ASTM D412 versus time.
The tests were performed at room temperature and 50% relative humidity.
Tensile strength as a function of cure time

| Cure time | Tensile Strength (psi) |
|---|---|
| 24 hrs | 956 |
| 48 hrs | 1261 |
| 72 hrs | 1240 |
| 4 days | 1243 |
| 5 days | 1408 |
| 6 days | 1423 |
| 7 days | 1509 |
| 8 days | 1506 |
| 9 days | 1627 |
| 10 days | 1588 |
| 11 days | 2496 |
| 12 days | 2118 |
| 13 days | 1919 |
| 14 days | 2750 |
| 15 days | 2297 |

Table 4. Films of various thicknesses were cured for 10 days and then tensile strength was measured according to ASTM D412. The tests were performed at room temperature and 50% relative humidity. The results are shown in Table 4.

TABLE 4

| Thickness (inch) | 0.010 inch | 0.020 inch | 0.030 inch | 0.05 inch |
|---|---|---|---|---|
| Tensile Strength (psi) | 2250 psi | 1826 psi | 1818 psi | 1876 psi |

The effect of weathering was also simulated by placement of a surface sprayed with the film at a thickness of 0.015 inches in a hot box, a humidity chamber or a refrigerator.

TABLE 5

Weathering simulation of film at an average thickness of 0.015 inches.

| Tensile Strength | 85-100° F. (16% RH) Hot Box | 52-77° F. (60-90% RH) Humidity Chamber | 14-16° F. (16% RH) Refrigerator |
|---|---|---|---|
| 24 hrs | 816 psi | 1263 psi | 55 psi |
| 3 days | 1036 psi | 1444 psi | 110 psi |
| 4 days | 1714 psi | 1541 psi | 276 psi |
| 7 days | 1847 psi | 1444 psi | 654 psi |
| 9 days | 1783 psi | 1848 psi | 700 psi |

Figure 3:
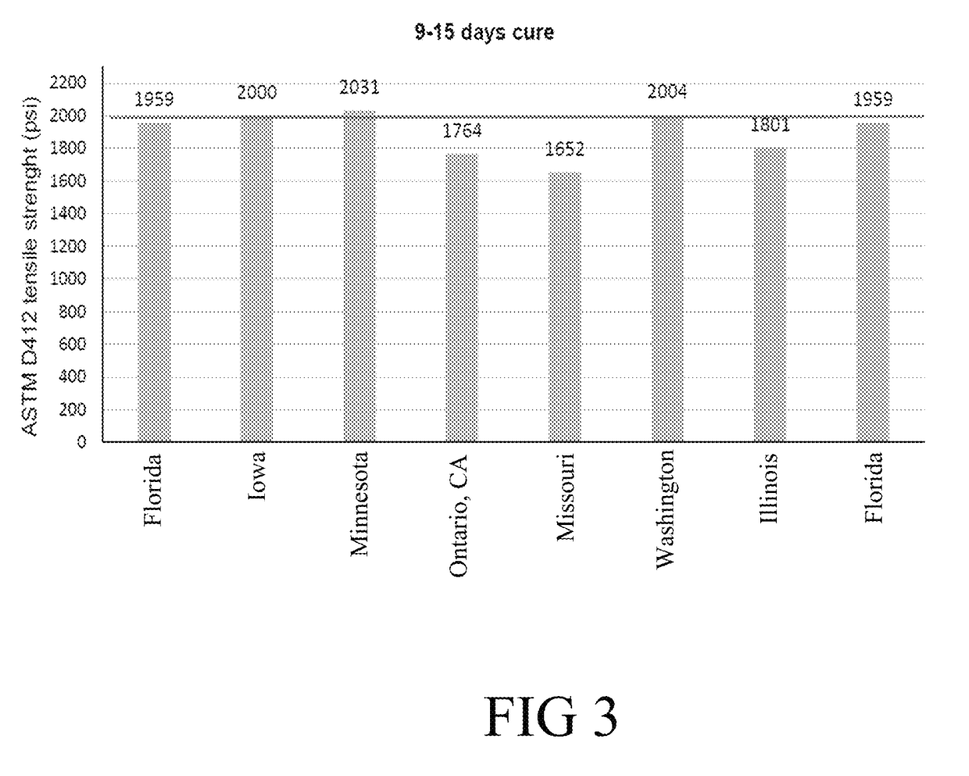
FIG. 3 compares a curing process vs. location (weathering condition) test run in room temperature and 50% relative humidity.

Based on these results, sample plates have been sprayed in 8 different States in the United States and Canada and the curing process has been evaluated through ASTM D412 Tensile strength testing. The results are reported in FIG. 3. Those results showed 75% of locations have tensile strength more than 1800 psi between 9-15 days. As shown in FIG. 3, the minimum tensile strength is 1652 psi. Even this minimum tensile strength is a remarkable improvement over prior art thin film UV stable applications.

To Evaluate the films' performance per industry requirements, some other tests have been run after finalizing thickness, machine set up, weathering condition and surface preparations. Results show that the polyurea films compete with other coatings like paint and powder coating in the same applications. The test results reports in Table 6.

TABLE 6

Table 6. Additional performance testing of the polyuria films

| Test title | Result |
|---|---|
| Chip Resistance ASTM D3170 | No. of chips: 0; Rating 10 |
| Hardness, Shore D ASTM D2240 | 54 shore D |
| Taber Abrasion ASTM D4060 | 12.3 mg loss/1000 cycle; 500 gr; C17 |
| QUV Topcoat ASTM G154 | ΔE ≤ 2 @ 3000 hrs |

Figure 4:
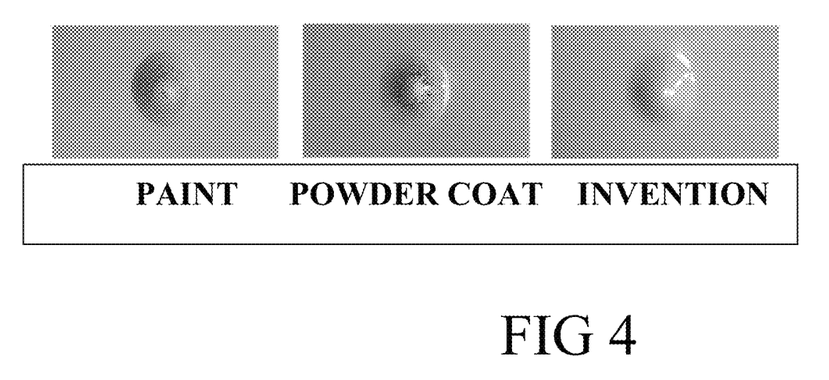
FIG. 4 illustrates the ASTM D2794 reverse impact test results for the polyurea film of the present invention, Powder Coat, and Axalta Imron Elite Paint.

Further experimentation with the films was conducted. A tests for impact resistance according to ASTM D2794 on surfaces that have been modified by the polyurea film, powdercoat and a paint. These results are found in Table 7 and FIG. 4. When the polyurea film is applied to surface, the resultant surface is even more resistant to damage than the same surface coated with powder coat or paint.

TABLE 7

| ASTM D2794 | | |
|---|---|---|
| Present invention | Powder Coat | Paint |
| No failure @320 inch · lbs | Fails @24 inch · lbs | Fails @24 inch · lbs |

Figure 5:
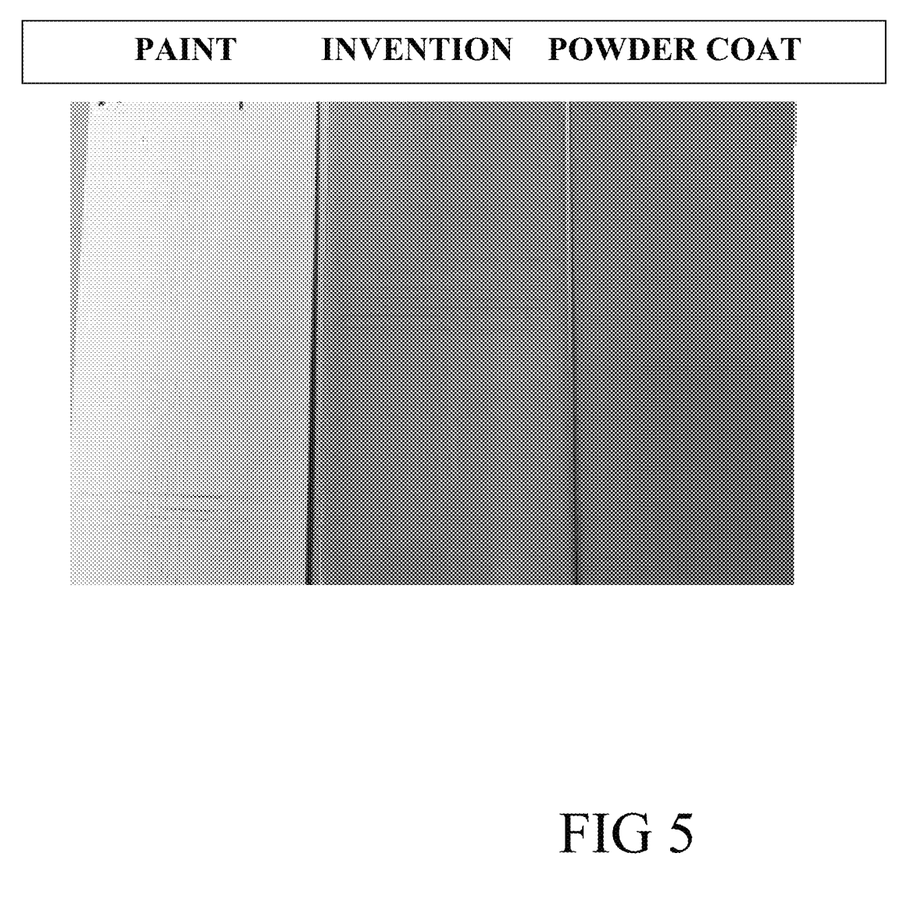
FIG. 5 illustrates the ASTM D3359 cross hatch test results for the polyurea film of the present invention, Powder Coat, and Axalta Imron Elite Paint.

Another test for durability if the cross hatch adhesion test. Results presented in Table 8 and FIG. 5 indicate the film has a durability of at least the powder-coat.

TABLE 8

| ASTM D3359 | | |
|---|---|---|
| Paint | Present invention | Powder Coat |
| ASTM CLASS: 3B | ASTM CLASS: 5B | ASTM CLASS: 5B |

Figure 6:
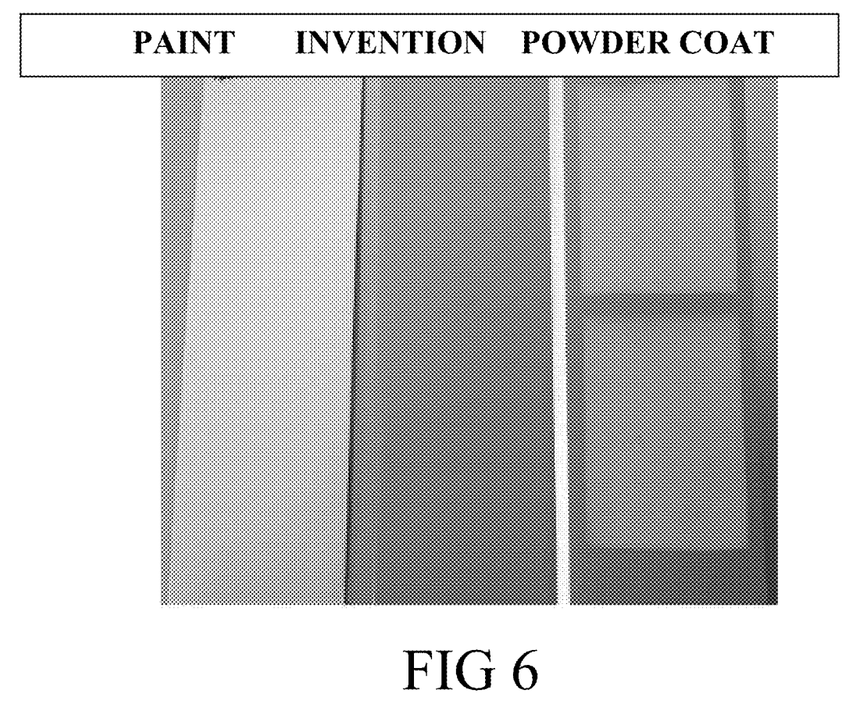
FIG. 6 illustrates the ASTM G154 UV exposure test results for the polyurea film of the present invention, Powder Coat, and Axalta Imron Elite Paint.

A test of durability to the film to UV exposure was also conducted and is shown in Table 9 and FIG. 6. As demonstrated, the film has superior UV damage resistance.

TABLE 9

| ASTM G154 | | | | |
|---|---|---|---|---|
| EXPOSURE TIME 1000 hrs | ΔE | Δa | Δb | ΔG |
| Invention | 0.28 | 0.00 | −0.13 | −2.10 |
| Powder Coat | 14.66 | 0.42 | 0.05 | −75.10 |

In conclusion the test results proved that the films of the present invention are a permanent solution for any application in which return to service and capital investment are crucial business parameters. Features such as fast cure, weather stability and bubble free film allow the applicator to rethink the coating process. Also with superior weather stability and physical properties, present invention gives applicators a long-term solution to the ongoing repair process of today's thin film coatings. Unique, durable, armor-like, scratch and dent resistant, and light weight characteristics of the films of the present invention are an ideal custom coating for rocker panels, fender flares, Jeeps, complete exteriors and other automotive uses.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When "only A or B but not both" is intended, then the term "only A or B but not both" will be employed. Thus, use of the term "or" herein is the inclusive, and not the exclusive use. As used in the specification and the claims, the singular forms "a," "an," and "the" include the plural. Finally, where the term "about" is used in conjunction with a number, it is intended to include ±10% of the number. For example, "about 10" may mean from 9 to 11. Reactant and component refer to the same concept and refer to part of the reactant mixture as a whole. The term film could also refer to a coating or sheet or layer that is applied to a surface. The surface may be any desired material or shape.

As stated above, while the present application has been illustrated by the description of embodiments, and while the embodiments have been described in considerable detail, it is not the intention to restrict or in any way limit the scope of the appended claims to such detail. Additional advantages and modifications will readily appear to those skilled in the art, having the benefit of this application. Therefore, the application, in its broader aspects, is not limited to the specific details and illustrative examples shown. Departures may be made from such details and examples without departing from the spirit or scope of the general inventive concept.

The invention claimed is:

1. A polyurea film formed by reacting a mixture of a first reactant and a second reactant,
wherein the first reactant comprises between about 1% and about 10% by weight of additives and at least about 90% by weight of at least one polyaspartic ester having the following formula:

wherein R of each polyaspartic ester is independently derived from a diamine selected from the group consisting of the diamine of Formula I, the diamine of Formula II, and the diamine of Formula III:

Formula I

Formula II

Formula III wherein the second reactant comprises an aliphatic polyisocyanate; and wherein the reactant mixture forms a film that is tack free in about 5 minutes after application of the reactant mixture to a surface.

2. The film of claim 1, wherein the aliphatic polyisocyanate is a hexamethylene diisocyanate trimer.

3. The film of claim 1, the first reactant further comprising one or more of:

a hydroxyl functional polyester and a polyacrylate.

4. The film of claim 1, wherein the reactant mixture has a 1:1 volumetric ratio of the first and second reactants.

5. The film of claim 1, wherein the film contains 70-100% by weight solids.

6. The film of claim 1, wherein the film is UV resistant.

7. The film of claim 1, wherein the film has an impact resistance of at least about 320 inch pounds.

8. The film of claim 1, wherein the additives result in a finished film with smooth, powder coat, gloss or semi-gloss finish.

9. The polyurea film of claim 1, the film characterized by a minimum tensile strength of 1652 psi.

10. The polyurea film of claim 1, the film characterized by an elongation of 99%, 116%, or 132% in the ASTM D412 test.

11. The polyurea film of claim 1, wherein the first reactant and second reactant, prior to forming the reactant mixture, are maintained under a static pressure between 1800 and 2000 psi at a temperature of 100° F.

12. The polyurea film of claim 1, wherein the first reactant and second reactant, prior to forming the reactant mixture, are maintained under a static pressure between 1700 and 1750 psi at a temperature of 120° F.

13. The polyurea film of claim 1, wherein the first reactant and second reactant, prior to forming the reactant mixture, are maintained under a static pressure between 2000 and 2050 psi at a temperature of 160° F.

14. A method of making the polyurea film of claim 1 comprising:

providing a plural component spray machine to be connected to at least two pressurized and heated component tanks, the spay machine having an atomizer and a fluid housing;

connecting to the spray machine a pressurized and heated tank that is a source of the first reactant;

connecting to the spray machine a pressurized and heated tank that is a source of the second reactant; and applying the reactant mixture to a surface with the spray machine, wherein the first and second reactants are mixed through high pressure impingement within the fluid housing of the spray machine, and the reactant mixture exits the spray machine via the atomizer, thereby producing the polyurea film.

15. The method of claim 14 wherein the temperature and pressure conditions of the pressurized tank and spray machine, and the atomizer tips of the spray machine are varied to obtain a gel time of about 45 seconds after mixing the first and second reactants, and the film is dry to the touch in about 3 minutes after the reaction mixture is applied to the surface.

16. The method of claim 14, wherein the additives result in a finished film with smooth, powder coat, gloss or semi-gloss finish.

17. The method of claim 14, wherein the reaction mixture is applied to the surface to produce a film thickness of about 0.015 inches.

* * * * *